United States Patent Office 3,423,496
Patented Jan. 21, 1969

3,423,496
PROCESS FOR PREPARING RESILIENT
GRAPHITE STRUCTURES
Franciszek Olstowski, Freeport, Tex., assignor to The
Dow Chemical Company, Midland, Mich., a corporation of Delaware
No Drawing. Filed Apr. 4, 1966, Ser. No. 539,747
U.S. Cl. 264—118
Int. Cl. D04h 13/00
7 Claims

ABSTRACT OF THE DISCLOSURE

A process for preparing resilient graphite structures by admixing vermicular graphite with an organic liquid treating agent having a boiling point at atmospheric pressure of greater than about 100° C. and compressing the thus treated vermicular graphite under a pressure of at least about 25 p.s.i.

---

This invention relates to resilient graphite structures and to a method for making such structures.

A need has existed for resilient materials which will withstand high temperatures for extended periods of time. Such materials would be useful as springs for high temperature uses, resilient gasketing for sealing furnace doors and the like. The materials presently available will either not tolerate extreme temperature service or they do not retain their resiliency at such temperatures.

It is an object of this invention therefore to provide a resilient material which will withstand lengthy exposure to high or low temperatures. Another object is to provide a resilient material which will retain its resiliency at extreme temperatures for extended periods of time. A further object is to provide a process for preparing such materials. These and other objects and advantages of the present invention will become obvious from a reading of the following detailed description.

It has now been discovered that resilient graphite structures may be prepared by contacting vermicular graphite with a relatively non-volatile organic liquid and uniaxially compressing the thus treated vermicular graphite into a cohered graphite structure. Upon release of the compressive force, the graphite structure will expand along the axis of compression to form a shape resilient graphite structure.

Vermicular graphite as used herein refers to a low density particulate, worm-like form of expanded graphite which may be prepared, for example, by introducing an intercalating agent such as fuming nitric or sulfuric acid, mixtures of concentrated nitric and sulfuric acid, bromine, and the like, between the laminae of particles of natural flake graphite and expanding such treated graphite by heating. Usually, a temperature of 500° C. or more is required to achieve good expansion, but, under some circumstances, a lower temperature may be employed. Under these conditions, expansion in volume of up to 400 or 500 times usually occurs to produce a very light weight, particulate, vermicular form of graphite which is easily malleable and compressible into shaped internal structures.

The relatively non-volatile organic liquids useful as treating agents in this invention are those organic liquids and semi-liquids having a boiling point at atmospheric pressure of greater than about 100° C. Such materials include halogen substituted hydrocarbons, polysiloxanes, aliphatic, aromatic and heterocyclic organic compounds, sulfur-containing compounds such as mercaptans, sulfides and sulfones, oxygen-containing compounds such as glycols, acids, ethers, esters and ketone, nitrogen-containing compounds such as amines and nitriles, phosphorous-containing compounds such as organophosphates and phosphines and the like. Such materials may be simple liquid organic compounds or liquid polymers. Such treating agents may be applied directly to the vermicular graphite or they may be incorporated into a solvent to reduce their viscosity prior to contact with the vermicular graphite. Of particular utility as treating agents herein are the liquid hydrocarbon oils, silicone oils, chlorofluorocarbon oils, glycerine and glycols. Mixtures of miscible liquids may be employed to provide a broader liquid-phase temperature range than either component alone.

In order to achieve the desirable property of resiliency in the compressed vermicular graphite structure, a proportion of liquid organic treating agent is added to the vermicular graphite which is equal to from about 1 to about 50 weight percent of the treated mass. In general, the lower the proportion of liquid organic treating agent employed, the less is the resiliency possessed by the final structure and the higher the proportion of treating agent, the greater is the resiliency imparted to the final compressed structure. Even when 50 weight percent of the total weight of the treated mass of vermicular graphite is an organic liquid treating agent, the compressed structure appears dry with none of the organic liquid being visually noticeable.

Application of such organic liquid treating agents may be by any suitable means which disperses the organic liquid more or less uniformly throughout the vermicular graphite mass. As care must be taken in blending and mixing vermicular graphite not to either compact it or shear it into small particles, spraying the liquid organic treating agent onto the vermicular graphite is a particularly effective means.

After mixing the vermicular graphite and the liquid organic treating agent in the desired proportions, the treated graphite is compressed under a pressure of greater than about 25 p.s.i. In general, however, pressures of between about 100 p.s.i. and 5000 p.s.i. or higher are employed. Such compression produces structures having densities of from about 0.01 gm./cc. to about 1.5 gm./cc. with highest resiliency in the axis of compression. Untreated graphite, compressed under an equal pressure produces structures having little or no resiliency and having densities from 10 to 60 times the density of the resilient structures prepared herein.

Many shaped resilient structures may be prepared by simply compressing the treated vermicular graphite into the desired configuration. Alternately, compressed resilient structures easily may be cut, sanded or machined into the desired configuration.

Structures prepared in accordance with this invention find utility as shock or impact absorbing material, vibration or sound absorbing materials, springs, resilient gasketing and the like and are particularly valuable in highly corrosive atmospheres and for use under conditions of moderately extreme heat or cold. The useful temperature range includes those temperatures at which the entrapped liquid is not substantially volatilized or embrittled.

The following examples are provided to further illustrate the invention but are not to be construed as limiting the scope of the invention.

Example 1

A mass of vermicular graphite weighing 22 grams and having a bulk density of 0.3 lbs./ft.$^3$ (.0048 gm./cc.) was sprayed with 10 grams of a viscous petroleum oil in a volatile solvent applied as an aerosol spray to a fluidized mass of vermicular graphite. The oil had a viscosity of 1700 centistokes and a density of about 1 gm./cc. and coated each particle of graphite with a substantially uniform layer of oil. The volatile solvent was allowed to evaporate. A portion of the oil-treated graphite was poured into a mold and compressed uniaxially under a pressure of about 348 p.s.i. to yield a cohered unitary graphite structure having a density of about 0.019 gm./cc. which was resilient in the axis of compression. When compressed under 348 p.s.i., such structure had a thickness of 1.3 cm. and when not compressed the structure recovers to a thickness of 2.1 cm.

The compressed sample was reinserted into the mold and subjected to a pressure of 2080 p.s.i. Under such pressure, the graphite sample measured 0.3 cm. in thickness and when the pressure was relieved, the graphite sample expanded to a thickness of 1.5 cm. The sample at this stage of compression had a density of 0.026 gm./cc. and was resilient in the axis of compression.

Upon compression of the same sample under a pressure of 4160 p.s.i., a structure was obtained which had a thickness under such pressure of 0.2 cm. and upon release of the pressure had a thickness of 1.3 cm. and a density of 0.031 gm./cc. The sample was still resilient in the axis of compression.

For comparison, another portion of the vermicular graphite was compressed in the same manner without first having been treated with the hydrocarbon oil. At 348 p.s.i. applied pressure the compact density was about 0.98 gm./cc. At 2080 p.s.i. applied pressure, the density was about 1.52 gm./cc. and at 4160 p.s.i. the density was 1.61 gm./cc. With these latter compacts, at all three degrees of compaction substantially no resiliency was apparent as the pressure was removed from the compact.

Example 2

In the same manner as Example 1, an 18 gram sample of vermicular graphite was sprayed with 4 grams of petroleum oil. The oil-treated graphite was placed in a mold and compressed under a pressure of 5000 p.s.i. Upon release of the pressure, the unitary graphite structure partially expands to yield a resilient compact having a density of 0.15 gm./cc. The compact was repeatedly recompressed under a pressure of 5000 p.s.i., maintained in the compressed state for about 15 seconds and the pressure released. Initially the compact under pressure had a thickness of 0.5 cm. and the thickness without compression was of 2.4 cm. After 10 cycles, the compressed thickness remained 0.5 cm. and the uncompressed thickness was 1.7 cm. The structure dimensionally stabilized at this point. An additional 12 cycles of compression produced a structure having substantially the same compressed and uncompressed dimensions as those obtained at the 10th cycle.

Example 3

In the same manner as Example 1, a quantity of vermicular graphite was treated by spraying with a silicone oil having a density of 1.12 gm./cc. and a viscosity of 19.7 centistokes. The final treated vermicular graphite contained 10 weight percent silicone oil. Compression of the treated vermicular graphite under a pressure of 2000 p.s.i. yielded a spongy resilient unitary structure, having a density of about 0.3 gm./cc. which expands to several times its compressed thickness when such pressure is released.

Similarly, a quantity of vermicular graphite was sprayed with a volume of polytrifluorochloroethylene oil in a CC14 solvent. After the solvent had evaporated, the treated vermicular graphite mass was found to contain 15 weight percent polytrifluorochloroethylene oil. The treated vermicular graphite was compressed with 5000 p.s.i. pressure to yield a unitary graphite compact having a density of 0.52 gm./cc. This structure was highly resilient in the axis of compression.

In the same manner, vermicular graphite treated with glycerine and compressed under 1750 p.s.i. yielded a resilient, unitary structure.

Various modifications can be made in the present invention without departing from the spirit or scope thereof for it is understood that I limit myself only as defined in the appended claims.

I claim:

1. A process for preparing resilient graphite structures which comprises admixing vermicular graphite with an organic liquid treating agent having a boiling point at atmospheric pressure of greater than about 100° C. and compressing the thus treated vermicular graphite under a pressure of at least 25 p.s.i.

2. The process of claim 1 wherein the treated vermicular graphite contains from about 1 to about 50 weight percent of the organic liquid treating agent.

3. The process of claim 1 wherein the pressure applied is between about 100 p.s.i. and about 5000 p.s.i.

4. The process of claim 2 wherein the organic liquid treating agent is a hydrocarbon oil.

5. The process of claim 2 wherein the organic liquid treating organic agent is a silicone oil.

6. The process of claim 2 wherein the organic liquid treating agent is a chlorofluorocarbon oil.

7. The process of claim 2 wherein the organic liquid treating agent is glycerine.

References Cited

UNITED STATES PATENTS

| 1,319,151 | 10/1919 | Gilligan | 106—38.5 |
| 3,323,869 | 6/1967 | Olstowski | 23—209.1 |

FOREIGN PATENTS 991,581  5/1965  Great Britain.

ROBERT F. WHITE, *Primary Examiner.*
JAMES R. HALL, *Assistant Examiner.*

U.S. Cl. X.R.

23—209.1; 106—38.5; 264—109, 120